C. H. HORTON.

COMBINED GRAIN THRASHER AND CLOVER SEED HULLER.

No. 10,485. Reissued June 3, 1884.

WITNESSES.

S. G. Nottingham

George F. Downing.

INVENTOR

C. H. Horton,

By Leggett & Leggett.

Attorney

N. PETERS, Photo-Lithographer, Washington, D. C.

UNITED STATES PATENT OFFICE.

CHARLES H. HORTON, OF WELLINGTON, OHIO.

COMBINED GRAIN-THRASHER AND CLOVER-SEED HULLER.

SPECIFICATION forming part of Reissued Letters Patent No. 10,485, dated June 3, 1884.

Original No. 259,157, dated June 6, 1882. Application for reissue filed January 9, 1884.

*To all whom it may concern:*

Be it known that I, CHARLES H. HORTON, of Wellington, in the county of Lorain and State of Ohio, have invented a new and Improved Combined Grain-Thrasher and Clover-Seed Huller, of which the following is a full, clear, and exact description.

This invention consists of improvements in grain-thrashing and clover-seed-hulling machines, the said improvements being designed to simplify the contrivance, whereby the thrashing and hulling apparatus may be embodied in one machine, so as to be worked with greater facility than as heretofore arranged, all as hereinafter more fully described.

Reference is to be had to the accompanying drawings, forming part of this specification, in which similar letters of reference indicate corresponding parts in all the figures.

Figure 1:
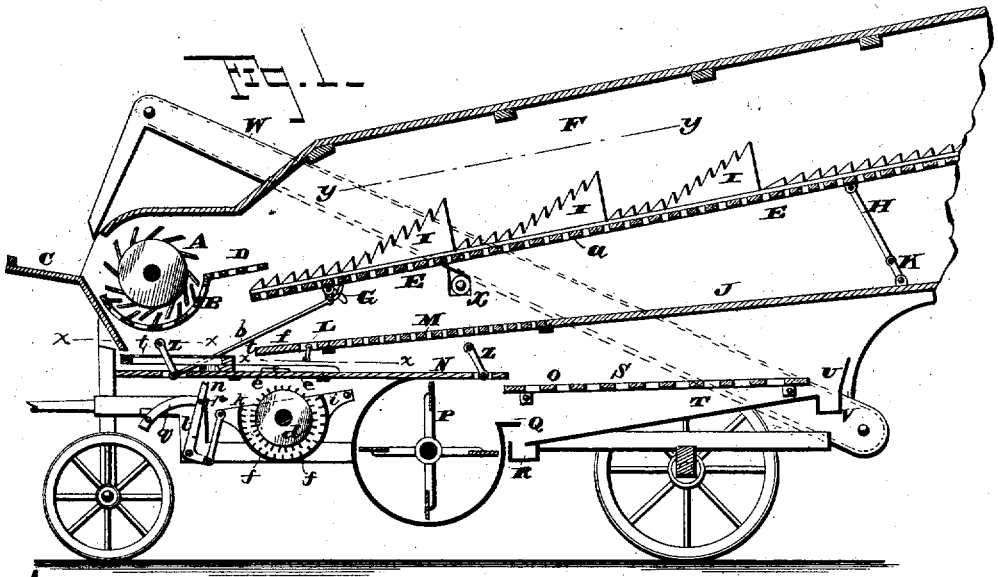
Figure 2:
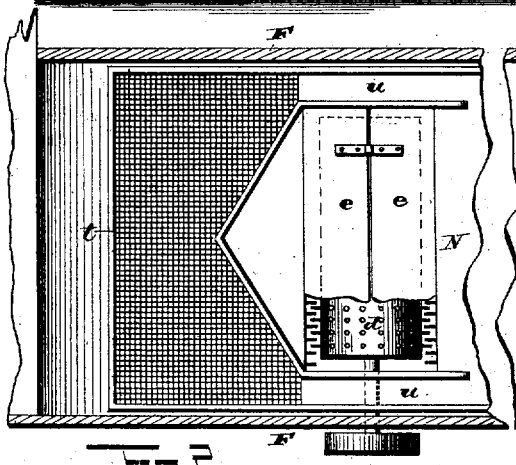
Figure 3:
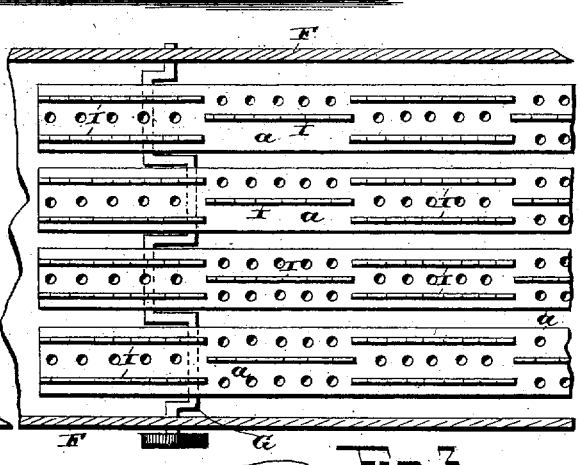

Figure 1 is a longitudinal sectional elevation of my improved machine. Figs. 2 and 3 are horizontal sections of parts of the same on lines *x x* and *y y*, respectively, of Fig. 1; and Fig. 4 is a longitudinal sectional elevation through the huller.

A represents the thrashing-cylinder, working in the perforated concave B, the grain or clover to be thrashed being supplied to it from the feeding-table C in the usual manner. From the cylinder the thrashed grain is discharged over the perforated apron D onto the lower end of the separator E, the construction of which is one of the improvements of my invention, the same being a series of, say, four long strips, *a*, Fig. 3, of wood or other material, arranged side by side between the sides F of the separator-case, with the edges separated a little, to allow some of the grains to fall through, also having perforations for that purpose, and being pitched on a slight ascending inclination from the cylinder A, and mounted near the lower end on the multiple-crank shaft G, and on the vibrating supporting-arms H at the other end, the several cranks of the shaft being pitched reversely to each other successively for each successive section *a*, so that as one works forward those next to it work backward; and upon each section there are several saw-toothed-shaped straw-carriers, mainly in the form of thin triangular plates, with one end notched and set uppermost, and with its base end toward the upper end of the separator, the arrangement being designed so that when the separator-sections descend by the crank movement the straw-carrier will draw back under the straw, then ascend and advance the straw toward the outer or discharge end of the machine. This separator receives the straw at its crank end from the cylinder and gives it a sharp tossing motion, which motion decreases as the straw approaches the rear end of the machine, and at a point directly over the arms H the slats of the separator have but very little vertical motion, as these arms oscillate on a fixed fulcrum, so that the grain is sifted through the perforations in the bottom of the oscillating sections or shakers. The thin triangular plates I play an important part in facilitating the separation of the thrashed grain from the straw. These triangular plates are placed near the cranked end of the separator, and raise the mixed straw and grain and move it forward with a rolling motion. This motion separates the straw and loosens the grain therein, and allows the latter to fall through the perforated slats of the separator.

The crank G is to be driven by any approved means of connection with the operating mechanism for working the separator. (Not shown.) From this separator the straw goes to the stacker, as usual, and the grain falls upon the vibrating bottom J, suspended on the extensions K of arms H, and the rocker-links L being worked by the former. From along the upper portion of this bottom J the grain is carried down onto the perforated portion M of said bottom J, through which it falls to the shaker N, which delivers it at O to the fan-blower P, by which it is blown over apron Q into the grain-spout R, to be delivered from the machine, the chaff and other light matters being blown away from over the cleaner S. The grains that may be blown over bottom T, together with heads, &c., are caught by the guard U and spout V, and discharged thereby into the elevators W, to be returned to the cylinders, if desired, or to the fan, as the conditions may require. In the latter case the elevator is opened by a slide (not shown) in its bottom over the conveyer X, which receives said matters therefrom and discharges them upon the bottom J. The shaker N, receiving the grain, chaff, &c., from the shaking bottom J, conducts the matters falling upon it along in the direction of the air-blast created by the fan, and delivers them upon the cleaner S by a slight descent in front of the fan, where the said blast has powerful effect in carrying off the light matters. This shaker is suspended by the links Z, pivoted to the case-sides F, and it is operated by one or more connecting-rods, *b*, from the crank-shaft G. Whatever grains fall directly from the cylinder A through the perforations of the concave B are received upon the forward portion of the shaker N, and are passed along with the rest to the fan.

Figure 4:
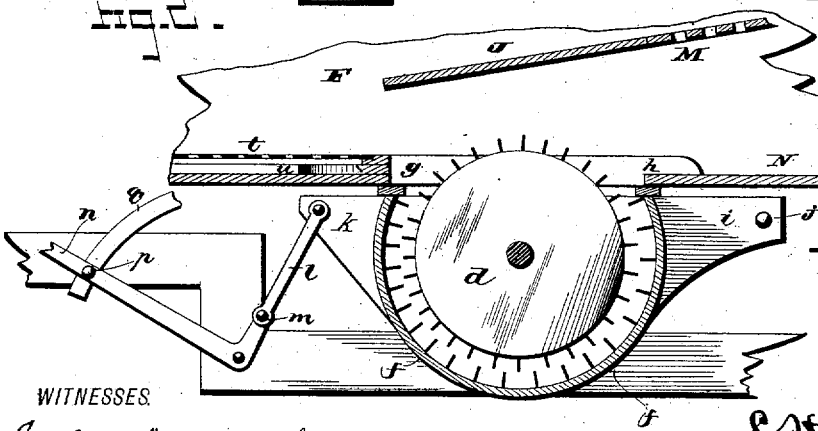

For the purposes of the clover-huller attachment, the cylinder *d* of which is located under shaker N in advance of the fan, this shaker N has an opening covered by removable sections *e* directly over the said cylinder *d*, for the huller-cylinder *d* to rise up through, as shown in Fig. 4, when adjusted for work, and through which the unhulled seed fall to the cylinder-concave *f* at *g*, and are delivered therefrom at *h*, Fig. 4. The huller-cylinder concave *f* is pivoted by arms *i* to the frame at *j*, and is connected by arms *k*, at the side opposite to said pivots, to the elbow-lever *l*, arranged on rock-shaft *m*, so that it is swung up into position by depressing the handle *n* of said rock-lever *l*, and is secured in the working position by a binding-screw, *p*, screwing into the arc *q*.

It is desirable that the clover-seeds that may be hulled by the thrashing-cylinder shall not pass through the huller *d f*. The perforated part M of the bottom J is therefore made removable for substituting a clover-screen, through which the hulled seeds falling through the separator onto said bottom may fall upon shaker N beyond the opening into the huller, to pass along to the fan, while for the like escape of those hulled seeds falling directly from the thrashing-cylinder a clover-screen, *t*, is placed on the shaker N directly under the thrashing-cylinder and sufficiently above the said shaker for the seeds to escape from under it, and from where a passage, *u*, is made around each end of the huller-cylinder, the said cylinder being made shorter than the breadth of the case and shaker for this purpose. This clover-screen *t* is not removed when grain is thrashed. By these provisions for preventing the hulled seeds from passing through the huller there is a large percentage of saving effected, because seeds already hulled before entering it will be ground or broken and destroyed.

Having fully described my invention, what I claim as new, and desire to secure by Letters Patent, is—

1. The combination, substantially as before set forth, of the separator consisting, essentially, of a series of flat perforated strips arranged side by side, each strip being provided with a series of independent triangular straw-carriers having toothed upper edges, the cranks supporting the inner ends of the strips, and oscillating arms supporting the outer ends of said strips, all of the above parts combined and adapted to operate substantially as set forth.

2. The combination, with the vibrating separator, consisting of a series of parallel perforated strips, each provided on its upper face with a series of independent triangular straw-carriers having toothed upper edges, of the cranks supporting the lower inner ends of the strips, the oscillating arms pivoted at their upper ends to the strips and near their lower ends to fixed fulcrums, and the vibrating bottom secured at its rear end to the oscillating arms below their fulcrums and at its forward end to oscillating links.

3. The combination, substantially as before set forth, of the vibrating bottom having a perforated section, the shaker, the fan, the tailings-spout V, the elevator W, the conveyer X, discharging above the perforated section of the vibrating bottom, and means for opening communication between the elevator and the conveyer.

4. The combination, with a concave and an inclined perforated apron forming a continuation of said concave, of the separator consisting of the flat perforated strips, the front ends of which rest under said apron, each strip being provided with a series of independent triangular straw-carriers having toothed upper edges, the cranks supporting the lower ends of the strips, and the oscillating arms supporting the upper ends thereof, substantially as set forth.

5. The combination, with the separator E and shaker N, of the vibrating bottom J, constructed with a removable perforated section, M, as and for the purpose specified.

6. The combination, with a thrashing-cylinder and concave, of the shaker N, having the ways *u*, the clover-screen *t*, mounted thereon, and the clover-huller *d f*, substantially as and for the purpose set forth.

7. The combination, with the frame, of a clover-huller, *d f*, adjustably connected therewith, a shaker, N, having an aperture, and a removable section, *e*, for covering said aperture, as shown and described.

CHARLES H. HORTON.

Witnesses:
A. DELONG,
R. H. GOODWIN.